(12) United States Patent
Nguyen et al.

(10) Patent No.: US 10,309,208 B2
(45) Date of Patent: Jun. 4, 2019

(54) ENHANCING PROPPED COMPLEX FRACTURE NETWORKS

(71) Applicant: Halliburton Energy Services, Inc., Houston, TX (US)

(72) Inventors: Philip D. Nguyen, Houston, TX (US); Walter T. Stephens, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/772,795

(22) PCT Filed: Feb. 3, 2016

(86) PCT No.: PCT/US2016/016288
§ 371 (c)(1),
(2) Date: May 1, 2018

(87) PCT Pub. No.: WO2017/135938
PCT Pub. Date: Aug. 10, 2017

(65) Prior Publication Data
US 2018/0320498 A1    Nov. 8, 2018

(51) Int. Cl.
*E21B 43/267*    (2006.01)
*C09K 8/80*    (2006.01)
(Continued)

(52) U.S. Cl.
CPC .............. *E21B 43/267* (2013.01); *C09K 8/40* (2013.01); *C09K 8/601* (2013.01); *C09K 8/62* (2013.01); *C09K 8/80* (2013.01)

(58) Field of Classification Search
None
See application file for complete search history.

(56) References Cited

U.S. PATENT DOCUMENTS

| 7,044,220 | B2 | 5/2006 | Nguyen et al. |
| 7,281,581 | B2 | 10/2007 | Nguyen et al. |

(Continued)

OTHER PUBLICATIONS

Dahl et al., "Application of Micro-Proppant in Liquid-Rich, Unconventional Reservoirs to Improve Well Production: Laboratory Results, Field Results, and Numerical Simulations" SPE 177663, 2015, 24 pages.

(Continued)

*Primary Examiner* — Anuradha Ahuja
(74) *Attorney, Agent, or Firm* — McGuireWoods LLP

(57) ABSTRACT

Methods including introducing a solids-free high-viscosity fracturing fluid (HVFF) into a subterranean formation to create or enhance at least one dominate fracture, introducing a low-viscosity pad fluid (LVPadF) into the subterranean formation above the fracture gradient pressure to create or enhance at least one first microfracture, wherein the LVPadF comprises micro-proppant, and placing at least a portion of the micro-proppant into the at least one first microfracture. Alternatingly introducing a first low-viscosity proppant fluid (LVPropF) and a high-viscosity crosslinked spacer fluid (HVCSF) into the subterranean formation, wherein the first LVPropF comprises proppant aggregates and the HVCSF comprises a gelling agent, a crosslinking agent, and a breaker, and placing at least a portion of the proppant aggregates into the dominate fracture, where the HVCSF separates clusters of proppant aggregates in the dominate fracture. Then, removing hydraulic pressure from the subterranean formation and activating the breaker in the HVCSF.

20 Claims, 2 Drawing Sheets

(51) Int. Cl.
*C09K 8/62* (2006.01)
*C09K 8/40* (2006.01)
*C09K 8/60* (2006.01)

(56) References Cited

U.S. PATENT DOCUMENTS

| | | |
|---|---|---|
| 7,581,590 B2 | 9/2009 | Lesko et al. |
| 8,066,068 B2 | 11/2011 | Lesko et al. |
| 8,479,816 B2 | 7/2013 | Lesko |
| 8,490,700 B2 | 7/2013 | Lesko et al. |
| 8,584,755 B2 | 11/2013 | Willberg et al. |
| 8,985,213 B2 | 3/2015 | Saini et al. |
| 2006/0113078 A1* | 6/2006 | Nguyen .............. C09K 8/80 166/280.2 |
| 2007/0193746 A1 | 8/2007 | Brannon et al. |
| 2012/0325472 A1 | 12/2012 | Litvinets et al. |
| 2013/0048282 A1 | 2/2013 | Adams et al. |
| 2013/0161003 A1* | 6/2013 | Makarychev-Mikhailov ............. C09K 8/685 166/280.1 |
| 2013/0284437 A1 | 10/2013 | Nguyen et al. |
| 2014/0014338 A1* | 1/2014 | Crews .............. E21B 43/26 166/280.1 |
| 2014/0034309 A1 | 2/2014 | Saini et al. |

OTHER PUBLICATIONS

Dahl et al., "Application of Micro-Proppant to Enhance Well Production in Unconventional Reservoirs: Laboratory and Field Results," SPE 174060-MS, 2015, 19 pages.

Inyang et al., "Development and Field Applications of Highly Conductive Proppant-Free Channel Fracturing Method," SPE 168996, 2014, 16 pages.

International Search Report and Written Opinion from PCT/US/2016/016288, dated Oct. 27, 2016, 15 pages.

\* cited by examiner

ENHANCING PROPPED COMPLEX FRACTURE NETWORKS

BACKGROUND

The embodiments herein relate generally to subterranean formation operations and, more particularly, to enhancing propped, complex-fracture networks in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure necessary to create or enhance at least one fracture in a particular subterranean formation location, increasing pressure within a formation may be achieved by placing fluid therein at a high flow rate.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture." The degree of success of a stimulation operation depends, at least in part, upon the ability of the proppant pack to permit the flow of fluids through the interconnected interstitial spaces between proppant particulates while maintaining open the fracture.

The complexity of a fracture network (or "network complexity") may be enhanced by stimulation operations to create new or enhance (e.g., elongate or widen) existing fractures, which may be interconnected. As used herein, the term "fracture network" refers to the access conduits, either natural or man-made or otherwise, within a subterranean formation that are in fluid communication with a wellbore. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
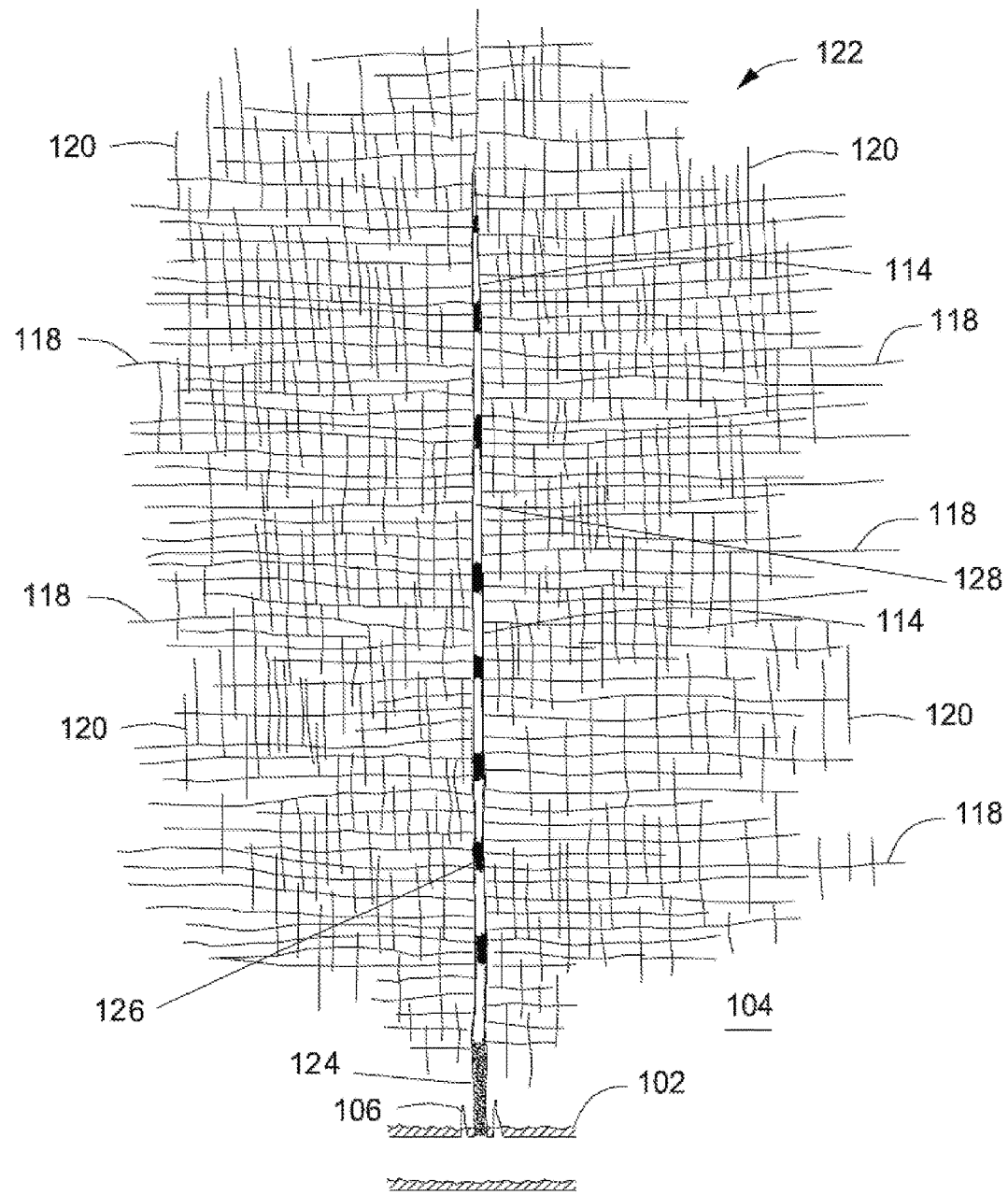
FIG. 1 is a cross-sectional side view of a propped complex fracture, according to one or more embodiments of the present disclosure.

The embodiments herein relate generally to subterranean formation operations and, more particularly, to enhancing propped complex fracture networks in subterranean formations.

The embodiments of the present disclosure provide for enhanced production of subterranean formations (i.e., wellbores in such formations), including in unconventional formations such as low or ultra-low permeability formations, as described below. The embodiments involve at least micro-proppant and proppant aggregate placement in created complex fracture networks, including in both the near-wellbore and far-field regions thereof, using a plurality of fluid stages and diversion techniques. As used herein, the term "near-wellbore region," and grammatical variants thereof (e.g., "near-wellbore," and the like), refers to an annular volume of a subterranean formation penetrated by wellbore from the outer diameter of the wellbore extending radially inward along a dominate fracture from the wellbore and into the formation a distance of no greater than about 10 meters (33 feet). As used herein, the term "far-field region," and grammatical variants thereof (e.g., "far-field," and the like), refers to an annular volume of a subterranean formation penetrated by wellbore from the outer diameter of the wellbore extending radially inward along a dominate fracture beyond the near-wellbore region, or along a branch fracture (e.g., a microfracture). In some instances, the far-field region may be beyond the dominate fracture tip into the subterranean formation, the dominate fracture tip being the portion of the dominate fracture that permits growth of the dominate fracture. As used herein and with the embodiments of the present disclosure, the wellbore may be vertical, horizontal, or deviated (neither vertical, nor horizontal), without departing from the scope of the present disclosure.

The present disclosure enhances production of subterranean formation wellbores by keeping one or more induced or natural microfractures open and connected with one or more dominate fractures (or secondary branch fractures) to allow produced fluids to flow. The dominate fractures described herein exhibit high conductivity by forming proppant-free channels. As used herein, the term "proppant-free channel," and grammatical variants thereof, refers to a void space between adjacent proppant aggregates or clusters of proppant aggregates (i.e., two or more proppant aggregates) in a fracture (e.g., a dominate fracture) that has no more than 70% of solid particulates suspended or otherwise therein immediately after closure stress is removed from a subterranean formation. That is, solid particulates may migrate into the proppant-free channel as a result of closure stress (e.g., from fines creation) that is not controllable by an operator in performing the methods described herein to create the proppant-free channel. As used herein, the term "closure stress" or "fracture closure stress," and grammatical variants thereof, refers to the stress at which a fracture effectively closes without proppant in place. The proppant prevents the fracture from closing (or fully closing) at said stress.

The embodiments described herein accordingly provide for dominate fractures having proppant-free channels therein, and having propped microfractures extending from the dominate fracture. As used herein, the term "dominate fracture," and grammatical variants thereof, refers to a primary fracture extending from a wellbore. A "microfracture," and grammatical variants thereof, as used herein, refers to any fracture extending from a dominate fracture or extending from any non-dominate fracture (e.g., a secondary fracture, a tertiary fracture, and the like) extending from a dominate fracture, and having a flow channel width or flow opening size less than that of the dominate fracture or non-dominate fracture from which it extends, and in the range of from about 1 µm to about 100 µm, encompassing any value and subset therebetween. The microfractures may be cracks, slots, conduits, perforations, holes, or any other ablation within the formation. As used herein, the term "fracture" refers collectively to dominate fractures and microfractures, unless otherwise specified.

Additionally, the embodiments described herein rely on forming proppant-free channels that permit the use of low-quality or weak proppant particulates or solids to form proppant aggregates that prop open the dominate fractures of the present disclosure. That is, the embodiments of the present disclosure do not require the use of high-quality, high-strength proppant particulates but instead can harness the crush quality (tending to crush into smaller pieces) to form resilient and strong proppant aggregates. Moreover, the proppant aggregates and the proppant-free channels of the present disclosure allow cost reductions related to less demand for high-quality proppant, less demand for large amounts of proppant, less storage space for large amounts of proppant, and the like.

The combination of micro-proppant and proppant-free channels formed using proppant aggregates in a complex fracture network as described herein maximizes production of hydrocarbons (or other produced fluids) from a subterranean formation wellbore by at least ensuring that the complex fracture network remains open, thereby optimizing exposed surface area per unit volume of reservoir for desorption of hydrocarbons. Moreover, the formation of stable, proppant-free channels enables significant reduction of proppant and treatment base fluid (e.g., water) requirements during hydraulic fracturing operations while allowing substantial conductivity to handle high production requirements. Importantly, these proppant-free channels further allow realization of the micro-proppant's ability to prop and maintain open microfractures because a low pressure drop through the highly conductive proppant-free channels permit longer performance lifetime of the micro-proppant.

The use of the plurality of fluids described herein further allows at least partial separation of the formation of the dominate fracture and the formation of one or more microfractures, such that the dominate fracture can continue to grow in length as microfractures are created or extended therefrom. That is, the dominate fracture growth is not stunted due to leakoff in the non-length direction to form the microfractures using the methods described in the present disclosure. As used herein, the term "leakoff" refers to the tendency of fluid to be forced into a formation (e.g., due to a magnitude of pressure exerted on the formation such as during fluid introduction). Additionally, stress shadowing reduces the width of the dominate fracture, further encouraging growth thereof in length.

Multistage fracturing may also be used with the embodiments of the present disclosure to further enhance fracture complexity, and thus the hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir intervals, or a plurality of locations within one or more reservoir intervals, in the subterranean formation are stimulated in succession, including dominate and microfractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval, followed by at least a second fracture formed at the same or a different reservoir interval in a subterranean formation. In some instances, multistage fracturing may involve fracturing a section of a reservoir interval, followed by plugging the fracture such that a treatment fluid may be diverted to a different location in the same reservoir interval or a different reservoir interval for forming a second fracture. The second fracture may then be plugged and the process repeated until the desired number of fractures are formed.

Accordingly, the embodiments of the present disclosure further permit creation of multiple dominate fractures within a single set of perforation clusters or slot clusters, which can further have microfractures that may or may not interconnect in the near-wellbore or far-field regions to further enhance fracture network complexity. As used herein, the term "perforation," and grammatical variants thereof, refers to a communication tunnel into a subterranean formation through which oil or gas is produced into a wellbore. A perforation may be made in a wellbore itself, or through casing or liner, which may or may not be cemented. The term "slot," and grammatical variants thereof, as used herein, refers to a type of perforation that has a slot shape, such that it has a narrow opening (e.g., rectangular in shape, and the like). Such perforations, slots, clusters of perforations, or clusters of slots are encompassed in the term "treatment interval," as used herein. Accordingly, a treatment interval may be a single perforation, a cluster of perforations, a single slot, a cluster of slots, or a combination thereof.

Other subterranean formation operations that may use the embodiments described herein may include, but are not limited to, re-fracturing operations (e.g., to add newly optimized perforated zones and initiate dominate fracture geometry), remedial treatments, completion operations, and the like, without departing from the scope of the present disclosure.

In some embodiments, the complex fracture network formation and production methods and systems described herein may be used in traditional subterranean formations or in low-permeability subterranean formations, such as shale formations, tight-gas formations (e.g., tight-gas sandstone formations), and the like (collectively referred to simply as "subterranean formations" or "formations"). The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy).

Examples of low-permeability formations may include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). An example of such a shale reservoir is the Eagle Ford Formation in South Texas, U.S.A. Tight-gas sands are low permeability formations that produce mainly dry natural gas and may include tight-gas carbonates, tight-gas shales, coal-bed methane, tight sandstones, and the like. Tight-gas sands may have permeabilities as low as less than about 1 mD ($9.869233 \times 10^{-6}$ m$^2$), and even as low as less than about 0.01 mD ($9.869233 \times 10^{-18}$ m$^2$).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments described herein, a plurality of fluid types are used, particularly with reference to viscosity, as well as proppant particulate and aggregate combinations, to create and enhance fracture network complexity. High-viscosity fluids are used in the embodiments herein typically to induce dominate fractures in the maximum stress direction of a formation, even if pre-existing fractures crossing the maximum stress direction exist. Such high-viscosity fluids may generate thick and planar dominate fractures with few microfractures extending therefrom, whereas low-viscosity fluids (e.g., slickwater, linear gel, and the like) generate narrow microfractures. The term "slickwater fluid," and grammatical variants thereof, refers to a low-viscosity linear fluid further comprising a friction reducing agent, such as polyacrylamide, to increase the flow of the fluid. The term "linear gel" refers to a non-crosslinked low-viscosity fluid comprising a gelling agent.

As used below, the term "treatment fluid" encompasses collectively each of the fluids used in the embodiments herein, unless otherwise specified. That is, the term "treatment fluid" may encompass all of the one or more (e.g., first, second, and so on) of the HVFF(s), the LVPadF(s), the LVPropF(s), and the HVCSF.

One or more of the plurality of fluids described herein is thus described with reference to its viscosity, being a "high-viscosity fluid" or a "low-viscosity fluid." As used herein, the term "high-viscosity fluid" refers to a fluid having a viscosity in the range of about 50 centipoise (cP) to about 20000 cP, encompassing any value and subset therebetween. For example, the high-viscosity fluid may have a viscosity of about 50 cP to about 4000 cP, or about 4000 cP to about 8000 cP, or about 8000 cP to about 1200 cP, or about 1200 cP to about 16000 cP, or about 16000 cP to about 20000 cP, encompassing any value and subset therebetween. Each of these values is critical to the embodiments of the present disclosure and depends on a number of factors including, but not limited to, the type of subterranean formation, the desired dimensions of the dominate fracture, the viscosity of the low-viscosity fluid, and the like. As used herein, the term "low-viscosity fluid" refers to a fluid having a viscosity in the range of about 1 cP to about 100 cP, encompassing any value and subset therebetween. For example, the low-viscosity fluid may have a viscosity in the range of about 1 cP to about 20 cP, or about 20 cP to about 40 cP, or about 40 cP to about 60 cP, or about 60 cP to about 80 cP, or about 80 cP to about 100 cP, encompassing any value and subset therebetween. Each of these values is critical to the embodiments of the present disclosure and depends on a number of factors including, but not limited to, the type of subterranean formation, the desired dimensions of the microfracture(s), the viscosity of the high-viscosity fluid, and the like.

Regardless of the particular viscosity of the high-viscosity treatment fluids and the low-viscosity treatment fluids, in any case, the high-viscosity fluid of the embodiments described herein must be at least about 100% higher in viscosity compared to the highest low-viscosity fluid in a particular fracturing stage method. That is, where one high-viscosity treatment fluid is used and two or more low-viscosity treatment fluids are used in a single method for treating a particular interval in a subterranean formation, the high-viscosity treatment fluid is at least about 100% higher in viscosity to the highest of the two or more low-viscosity treatment fluids used in the same method.

In some embodiments, the present disclosure provides a method comprising introducing a solids-free high-viscosity fracturing fluid (HVFF) into a subterranean formation at a first perforated interval. As used herein, the term "solids-free" with reference to a treatment fluid (either a high-viscosity treatment (or fracturing) fluid or a low-viscosity treatment fluid) means that no solid particulates are intentionally introduced into the fluid; it does not preclude solid particulates from entering into the fluid as it traverses the formation (e.g., formation fines, and the like). The HVFF is introduced into the formation above the fracture gradient of the formation to create or enhance at least one dominate fracture in the first treatment interval through one or more perforations. In some embodiments, the HVFF has a viscosity in the range of about 50 cP to about 20000 cP, as described above, encompassing any value and subset therebetween. In other embodiments, however, the viscosity of the HVFF is in the range of about 50 cP to about 5000 cP, encompassing any value and subset therebetween.

Thereafter, a low-viscosity pad fluid (LVPadF) is introduced above the fracture gradient into the subterranean formation at the first treatment interval through the one or more perforations to create or enhance at least one first microfracture extending from the at least one dominate fracture. The LVPadF comprises a base fluid and micro-proppant. The micro-proppant in the LVPadF is carried by the base fluid into the created or enhanced microfractures, wherein at least a portion of the micro-proppant is deposited therein. As used herein, the term "at least a portion" with reference to the placement of particulates (e.g., micro-proppant, degradable particulates, proppant particulates, and the like) or proppant aggregates means that at least about 70% of the particulates or aggregates are placed within a fracture (e.g., a microfracture, a dominate fracture, and the like) and up to 100%. In some instances, the micro-proppant placed within the at least one first microfracture forms at least a partial monolayer therein. That is, the micro-proppant may form a partial monolayer or a partial multilayer (a partial multilayer being greater than the "at least" partial monolayer) in the at least one first microfracture, without departing from the scope of the present disclosure. As defined herein, the term "partial monolayer" refers to a type of proppant pack in which micro-proppant are capable of holding a fracture open, and the separation between any one point of the fracture faces is less than, or about the same, as the largest exterior dimension of any one of the micro-proppant. As used herein, the term "partial multilayer" refers to a type of proppant pack in which micro-proppant are capable of holding a fracture open, and the separation between any one point of the fracture faces is more than the largest exterior dimension of any one of the micro-proppant. In a partial monolayer and/or partial multilayer, the micro-proppant may be spaced closely or widely apart.

After the formation of the dominate and microfracture(s), at least a two fluid method is employed using alternating introduction or simultaneous introduction of the two fluids into a treatment interval through the one or more perforations, the two fluids being a low-viscosity proppant fluid (LVPropF) and a high-viscosity crosslinked spacer fluid (HVCSF). The LVPropF comprises a base fluid and proppant aggregates, and the HVCSF comprises a base fluid, a gelling agent, a crosslinker, and a breaker. The proppant aggregates of the present disclosure are composed of proppant particulates and a binding agent, where the proppant aggregates are larger in size (and may further differ in shape) than any one of the proppant particulates forming the proppant aggregate. In some embodiments, particularly when the simultaneous introduction method is selected, the viscosities of the LVPropF and the HVCSF are selected such that the two fluids are immiscible, thereby preventing the contents of the two fluids from mixing and additionally allowing the HVCSF to surround the proppant aggregates and later be broken (i.e., by activating the breaker) to form the substantially-proppant free channels of the present disclosure. In some embodiments, the LVPropF and the HVCSF are immiscible by a means other than viscosity, such as selecting two immiscible base fluids for the two fluids, without departing from the scope of the present disclosure.

The introduction, either alternatingly or simultaneously, of the LVPropF and the HVCSF allows placement of the proppant aggregates into the dominate fracture such that the HVCSF surrounds and separates clusters of proppant aggregates in the dominate fracture. As used herein, the term "clusters of proppant aggregates," and grammatical variants thereof, refers to one or more proppant aggregates being physically separated in proximity from one or more other proppant aggregates (e.g., a space is formed therebetween). The separation space between the clusters of proppant aggregates forms the proppant-free channels after removal of the HVCSF. In some embodiments, the LVPropF may further comprise degradable particulates that can additionally aid in forming the clusters of proppant particulates separated by the HVCSF, which are later degraded before, during, or after activating the breaker in the HVCSF to form channels. In some instances, the activation of the breaker can trigger degradation of the degradable particulates. For example, the activation of a breaker may release an acid or a base that will trigger degradation of the degradable particulates. In other instances, a flush fluid or other activating agent can be introduced into the formation to contact the degradable particulates and initiate their degradation.

After placing the clusters of proppant aggregates in the dominate fracture, the clusters being surrounded by the HVCSF, the hydraulic pressure is removed from the subterranean formation. In removing the hydraulic pressure, the fractures (e.g., one or more dominate fracture(s) and one or more microfracture(s)) close and the placed micro-proppant and proppant aggregates maintain the fractures in an open position to allow fluid flow during the later production phase of the formation. To create the proppant-free channels, the breaker in the HVCSF is activated and the HVCSF is broken to allow the fluid to flow out of the fractures, out of the wellbore, and be collected at the surface. Accordingly, the space between the clusters of proppant aggregates is now devoid or substantially devoid of fluid and produced fluids can flow through the created proppant-free channels.

The method described herein of introducing the HVFF, introducing the LVPadF, alternatingly or simultaneously introducing the LVPadF and the HVCSF, removing hydraulic pressure, and activating the breaker in the HVCSF can be repeated one or more times at a same treatment interval, or be repeated one or more times at a different treatment interval. In this matter, the complex fracture network can be extended along a length of the wellbore in the formation and multiple dominate fractures and microfractures extending therefrom can be created. In such instances, the various microfractures extending from dominate fractures in different treatment intervals may extend and interconnect, further enhancing the production capability of the formation. Additionally, one or more of the steps can be repeated one or more times in the same interval or a different interval without the entire process being performed, such as to ensure that the particular functional aspect of the step is achieved (e.g., forming a desired length and width of the dominate fracture, and the like). The subsequent treatment intervals comprise one or more perforations to permit introduction of fluids therethrough.

In some embodiments, after placing at least a portion of the proppant aggregates into the dominate fracture, where the HVCSF surrounds and separates clusters of proppant aggregates, and before removing the hydraulic pressure and activating the breaker, a second LVPropF is introduced into the subterranean formation. The second LVPropF, like the first LVPropF, comprises a base fluid and proppant particulates. The proppant particulates are placed in the near-wellbore region of the dominate fracture to form a proppant pack. In some embodiments, the proppant particulates in the second LVPropF for forming the near-wellbore proppant pack are coated with a binding agent, as described below to enhance grain-to-grain contact and grain-to-formation contact between the proppant particulates themselves or the proppant particulates and the formation, respectively. In other embodiments, the second LVPropF for forming the near-wellbore proppant pack further comprises degradable particulates, where the degradable particulates are degraded (by any means described herein) before or during production of hydrocarbons to increase the conductivity of the proppant pack aside from spaces between the non-degradable proppant particulates alone. In such instances, although not required, the degradable particulates may alone or together with the proppant particulates be coated with a binding agent. The shapes of the various particulates (e.g., proppant particulates (alone or forming the proppant aggregates), degradable particulates, micro-proppant, and the like) is discussed in detail below. However, in some embodiments, the shape of the proppant particulates and/or the degradable particulates are cylindrical in shape (e.g., rod shaped), fiber-shaped, or oval shaped. For example, cylindrical, fiber, or oval-shaped particulates provide more contact points compared to other shapes, thus minimizing movement or rolling tendencies associated with those other shapes (e.g., spherical particulates).

Referring now to FIG. 1, illustrated is a cross-sectional side view of a propped complex fracture network 122, according to one or more embodiments of the present disclosure. As shown, a horizontal wellbore 102 is formed in a subterranean formation 104. It will be appreciated that although a horizontal wellbore 102 is depicted in FIG. 1, vertical or deviated wellbores may additionally be used in accordance with the methods of the present disclosure. Moreover, the wellbore 102 may be openhole, cased, or cased with cement at any or all portions, without departing from the scope of the present disclosure. Perforations 106 are formed in through the wellbore and into the subterranean formation. As shown, three perforations 106 (one having the dominate fracture 114 extending therethrough) are formed about the circumference of the wellbore 102; however, it will be appreciated that any number of perforations 106, including a single perforation and any multiple additional perforations may be formed, without departing from the scope of the present disclosure. Generally, the number of perforations is between about 1 and about 12, encompassing any value and subset therebetween. For example, the number of perforations may be about 1, 2, 3, 4, 5, 6, 7, 8, 9, 10, 11, or 12, encompassing any value and subset therebetween.

As the HVFF described herein is introduced into the formation 104 through perforations 106, a wide and planar dominate fracture 114 is formed. Due to fluid mechanics, the HVFF resists leakoff from the dominate fracture 114 and thus efficiently propagates the dominate fracture 114. Such a dominate fracture 114 may be propagated perpendicularly through horizontal complex bedding planes, such as when the formation 104 is an unconventional reservoir such as shale or other low or ultra-low permeability formation.

Thereafter, the LVPadF is introduced into the formation 104 through perforations 106 and into the dominate fracture 114. The low-viscosity qualities of the LVPadF encourages it to leakoff into the surrounding formation 104 from the dominate fracture 114 in a direction substantially perpendicular to the dominate fracture 114. As shown, the LVPadF accordingly produces thin (or relatively narrower compared to the dominate fracture 114) microfractures 118. The number and size/width of the formed microfractures 118 depends on a number of factors including, but not limited to, the viscosity of the LVPadF, the type of subterranean formation, the presence of existing cracks extending form the dominate fracture 114, and the like, and any combination thereof. In some embodiments, as the LVPadF creates or extends the multiple microfractures 118, it continues to leakoff from the microfractures 118, thereby forming multiple secondary microfractures 120 from the primary microfractures 118.

Accordingly, the complex fracture network 122 is formed with increased surface area for the production and recovery of hydrocarbon fluids. The complex fracture network 122 encompasses both the near-wellbore and far-field regions within the formation 104. During the formation of the microfractures 118, the micro-proppant in the LVPadF is placed therein to prop them open (i.e., forming at least a partial monolayer of proppant) and maintain them open during later hydrocarbon production of the formation 104. It is to be appreciated that more than one dominate fracture 114 may be initially formed through the perforations (e.g., substantially parallel dominate fractures), without departing from the scope of the present disclosure.

After the desired fracture complexity has been formed, the LVPropF and the HVCSF are introduced simultaneously or alternatively, where clusters of the proppant aggregates 126 are separated and surrounded by the HVCSF, which is later broken and removed to form the proppant-free channels 128. As discussed previously, in some embodiments, a second LVPropF comprising proppant particulates (and in some instances also degradable particulates) can be introduced thereafter to form a near-wellbore proppant pack 124 in the dominate fracture.

In some embodiments, the HVCSF further comprises micro-proppant and when the HVCSF is introduced into the formation, the micro-proppant therein migrates out of the HVCSF and into the microfractures. By including the micro-proppant in the HVCSF, the near-wellbore regions of the microfractures receive the micro-proppant and an at least partial monolayer is formed thereat. This inclusion of the micro-proppant in the near-wellbore region of the microfractures can ensure that the microfractures do not close during production resulting in a reduced or completely shut off fluid communication between the microfracture and the dominate fracture.

The base fluid for use in forming any one or more of the treatment fluids of the present disclosure may be an aqueous base fluid (e.g., fresh water, seawater, brine), an oil base fluid, an aqueous-miscible (i.e., having an alcohol) base fluid, an oil-in-water emulsion, or a water-in-oil emulsion. In any particular fracturing stage according to the methods described herein, the base fluid selected for forming the plurality of treatment fluids (e.g., the one or more HVFF, LVPadF, HVCSF, LVPropF, and the like) may be the same or different, without departing from the scope of the present disclosure. For example, as stated above the LVPropF and the HVCSF may be selected to have immiscible base fluids. In other instances, one or more treatment fluids may have additives included in addition to the particulates described herein (where "particulates" collectively refers to the micro-proppant, the proppant particulates, and the degradable particulates) that are best suited to a particular base fluid.

The micro-proppant and proppant particulates (including those forming the proppant aggregates) of the present disclosure may be composed of the same type of materials, although the micro-proppant and the proppant particulates used in any single or multiple stages of a fracturing operation need not be composed of the same material (although they may be), without departing from the scope of the present disclosure. Similarly, the shape(s) of the micro-proppant and the proppant particulates may be the same or different, without departing from the scope of the present disclosure. Accordingly, in some embodiments, the micro-proppant and the proppant particulates differ only in their size, whereas in other embodiments, the micro-proppant and proppant particulates may differ in one or more of material composition and/or shape as well as size.

Examples of suitable materials for forming the micro-proppant and/or proppant particulates of the present disclosure may include, but are not limited to, sand, ceramic materials, glass materials, polymer materials (e.g., polystyrene, polyethylene, etc.), nut shell pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. As used herein, the term "sand" refers to naturally occurring granular material composed of rock and mineral particulates (e.g., desert sand, beach sand). Nut shells may be from any fruit consisting of a hard or tough shell (encompassing seed and pit shells) including, but not limited to, pecan, walnut, pine, hazelnut, chestnut, acorn, brazil, candlenut, coconut, cashew, pistachio, and the like, and any combination thereof. The term "ceramic material" includes any inorganic crystalline material, compounded of a metal and a non-metal. Examples of suitable ceramics for use as the micro-proppant and/or proppant particulates herein include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof.

The shape of the micro-proppant and/or proppant particulates may be of any shape capable of meeting the desired unit mesh size or unit mesh size range, as described below. For example, the micro-proppant and/or proppant particulates may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal microparticulates may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The micro-proppants of the present disclosure have a unit mesh particle size distribution in the range of about 0.1 micrometers ($\mu m$) to about 100 $\mu m$, encompassing any value and subset therebetween. As used herein, the term "unit mesh particle size" or simply "unit mesh size" refers to a size of an object (e.g., a particulate or aggregate) that is able to pass through a square area having each side thereof equal to the specified numerical value provided herein. Accordingly, the micro-proppant may have a unit mesh particle size distribution of about 0.1 $\mu m$ to about 20 $\mu m$, or about 20 $\mu m$ to about 40 $\mu m$, or about 40 $\mu m$ to about 60 $\mu m$, or about 60 $\mu m$ to about 80 $\mu m$, or about 80 $\mu m$ to about 100 $\mu m$, or about 50 $\mu m$ to about 100 $\mu m$, encompassing any value and subset therebetween. Each of these values is critical to the embodiments of the present disclosure and depends on a number of factors including, but not limited to, the type of subterranean formation being treated, the size of the microfractures formed therein, the shape of the micro-proppant selected, and the like, and any combination thereof.

Generally, the micro-proppant is included in any treatment fluid of the present disclosure (e.g., the LVPadF and, in some instances, the HVCSF) in an amount in the range of about 0.01% to about 10% by weight of the base fluid forming the particular treatment fluid, encompassing any value and subset therebetween. For example, the micro-proppant may be included in a treatment fluid in an amount of about 0.01% to about 1%, or about 1% to about 2%, or about 2% to about 4%, or about 4% to about 6%, or about 6% to about 8%, or about 8% to about 10%, or about 0.01% to about 5%, or about 5% to about 10% by weight of the base fluid of the treatment fluid, encompassing any value and subset therebetween. Each of these values is critical to the embodiments of the present disclosure and depends on a number of factors including, but not limited to, the type of subterranean formation being treated, the size of the microfractures formed therein, the shape of the micro-proppant selected, and the like, and any combination thereof.

The proppant particulates described herein are either introduced into the subterranean formation alone or in aggregate form in an LVPropF. In either instance, the individual proppant particulates have a unit mesh size of less than about 3000 $\mu m$, or a unit mesh size distribution in the range of about 1 $\mu m$ to about 3000 $\mu m$, encompassing any value and subset therebetween. For example, the proppant particulates may have a unit mesh particle size of about 1 $\mu m$ to about 50 $\mu m$, or about 50 $\mu m$ to about 100 $\mu m$, or about 100 $\mu m$ to about 200 $\mu m$, or about 200 $\mu m$ to about 760 $\mu m$, or about 760 $\mu m$ to about 1320 $\mu m$, or about 1320 $\mu m$ to about 1880 $\mu m$, or about 1880 $\mu m$ to about 2440 $\mu m$, or about 2440 $\mu m$ to about 3000 $\mu m$, or about 600 $\mu m$ to about 2500 $\mu m$, or about 1100 $\mu m$ to about 2000 $\mu m$, encompassing any value and subset therebetween. In some instances, the proppant particulates have a unit mesh size distribution of about 400 $\mu m$ to about 840 $\mu m$, or about 600 $\mu m$ to about 1200 µm, or about 840 µm to about 1700 µm, or about 1700 µm to about 2400 µm, encompassing any value and subset therebetween. Each of these values is critical to the embodiments of the present disclosure and depends on a number of factors including, but not limited to, the crush resistance of the proppant particulates, the particulate operational conditions, whether the proppant particulates are used alone or to form proppant aggregates, and the like, and any combination thereof.

When the proppant particulates are included alone (i.e., individually) into a treatment fluid (e.g., a LVPropF), the proppant particulates are included in an amount in the range of about 5% to about 20% by weight of the base fluid of the treatment fluid, encompassing any value and subset therebetween. For example, the proppant particulates may be included in an amount of about 5% to about 8%, or about 8% to about 11%, or about 11% to about 14%, or about 14% to about 17%, or about 17% to about 20% by weight of the base fluid of the treatment fluid, encompassing any value and subset therebetween. Each of these values is critical to the embodiments of the present disclosure and depends on a number of factors including, but not limited to, the size of the proppant particulates, the size of the dominate fracture, the length of the near-wellbore region in which it is desired that a proppant pack be formed, and the like, and any combination thereof. In some embodiments, the near-wellbore proppant pack formed using the LVPropF comprising proppant particulates desirably extends into at least about 5% of the length of the dominate fracture, and in other embodiments extends into at least about 5% to about 10% of the length of the dominate fracture, encompassing any value and subset therebetween.

As described above, the proppant aggregates of the present disclosure comprise proppant particulates and a binding agent. In some embodiments, the proppant particulates selected for forming the proppant aggregates of the present disclosure exhibit a crush resistance as measured by API RP19C ($1^{st}$ ed., May 2008), referenced above, of greater than about 10% fines when exposed to fracture closure stress and temperature within a subterranean formation. As used herein, the term "crush resistance" refers to a measure of the amount of fines formed upon application of a stress (e.g., simulated or actual closure stress), thus translating into a measure of the reduction in size of the proppant particulates or proppant aggregate(s) due to the stress. As used herein, the term "fines" refers to portions of proppant particulate material or proppant aggregate material that has separated from the original particulate or aggregate due to the application of a stress (e.g., simulated or actual closure stress), and in some instances the stress in the presence of a particular temperature (e.g., simulated or actual downhole temperature). Accordingly, where crush resistance is desirable (e.g., to decrease costs associated with forming the proppant aggregates, to make use of locally available natural sand, and the like), one or more materials described above possessing this quality may be selected for the proppant particulates, or the material selected for forming the proppant particulates can be made more or less porous to achieve the desired crush resistance, without departing from the scope of the present disclosure.

In some embodiments, local sand is a preferred material for the proppant particulates used to form the proppant aggregates of the present disclosure. As used herein, the term "local sand" refers to locally available solid material that originates from surface sources, or from subsurface sources such as mine. Local sand may be preferred, as it is readily obtainable and is typically inexpensive because it is not traditionally used as proppant particulates in fracturing operations. Examples of commercially available local sand include, but are not limited to, sand available from Adwan Chemical Industries Co. Ltd. in Saudi Arabia, and sand available from Delmon Co. Ltd. in Saudi Arabia. Other commercially available types of sand include, but are not limited, to Brady Brown sand and Northern White sand types.

The proppant aggregates can be formed by combining a binding agent and at least two proppant particulates, where the proppant aggregate has a unit mesh size of at least greater than any one of the proppant particulates included therewith. The proppant aggregates are a solid or substantially solid mass that does not generally disperse without the application of shear. In some embodiments, the proppant aggregates are pre-formed (i.e., formed prior to their introduction into a subterranean formation), whereas in other embodiments, the proppant aggregates are formed on-the-fly by combining the proppant particulates and the binding agent as they are introduced into the formation. As used herein, the term "on-the-fly" refers to performing an operation during a subterranean treatment that does not require stopping normal operations.

As used herein, the term "binding agent" refers to a substance that coats or otherwise surrounds wholly or partially a proppant particulate that can enhance grain-to-grain contact between other proppant particulates, which may be uncoated or also wholly or partially coated with the binding agent. Suitable binding agents for use in forming the proppant aggregates of the present disclosure may include, but are not limited to, a non-aqueous tackifying agent, an aqueous tackifying agent, a silyl-modified polyamide compound, a curable resin (e.g., an epoxy resin), a crosslinkable aqueous polymer composition, a polymerizable organic monomer composition, a zeta potential-modifying aggregating composition, a silicon-based resin, a consolidation agent emulsion, a cement, asphalt, petroleum distillates, petroleum waste products, and any combination thereof. A suitable commercially available binding agent includes, but is not limited to, EXPEDITE® resin, available from Halliburton Energy Services, Inc. in Houston, Tex. The binding agents described herein may be coated wholly or partially onto the proppant particulates by any means suitable for the binding agent and proppant particulates selected including, but not limited to, dry coating, wet coating, flash coating, and any combination thereof. These binding agents are further suitable for coating wholly or partially one or more of the other particulates (e.g., micro-proppant, degradable particulates) of the present disclosure, as described herein.

The proppant aggregates described herein may be any shape suitable for use in a subterranean formation, including any of the shapes discussed previously with reference to the micro-proppant and the proppant particulates. Generally, the proppant aggregates are an amorphous shape, as they are formed by the agglomeration of two or more proppant particulates, which may or may not be of the same shape.

The proppant aggregates are included in the LVPropF in an amount in the range of about 3% to about 75% by weight of the base fluid of the LVPropF, encompassing any value and subset therebetween. For example, the proppant aggregates may be included in the LVPropF in an amount of about 3% to about 15%, or about 15% to about 27%, or about 27% to about 39%, or about 39% to about 51%, or about 51% to about 63%, or about 63% to about 75%, or about 3% to about 25%, or about 25% to about 50%, or about 50% to about 75% by weight of the base fluid of the LVPropF, encompassing any value and subset therebetween. Each of these values is critical to the embodiments herein and depends on a number of factors including, but not limited to, the size of the proppant aggregates, the material selected for the proppant particulates forming the proppant aggregates, the binding material selected, the fracture closure stress, and the like, and any combination thereof.

In some embodiments, degradable particulates may be included in a treatment fluid (e.g., one or more of the LVPropF) or the proppant aggregates themselves. When included, the degradable particulates can degrade downhole, such as after their placement in a fracture, to increase the conductivity of the fracture, and the porosity of a proppant pack or proppant aggregate. The degradable particulates can also be used to ensure that the proppant-free channels of the instant disclosure are formed by further ensuring the separation of proppant aggregates, without departing from the scope of the present disclosure.

Any degradable particulate suitable for use in a subterranean formation may be used in accordance with the embodiments described herein. For example, some suitable degradable particulates include, but are not limited to, degradable polymers, dehydrated salts, and any combination thereof. As for degradable polymers, a polymer is considered to be "degradable" herein if the degradation is due to, in situ, a chemical and/or radical process such as hydrolysis, or oxidation.

The degradable polymers may, in some instances be oil-degradable polymers such that during production of hydrocarbons the degradable polymers degrade, thus increasing the conductivity of the fracture for the flow of hydrocarbons. Examples of such oil-degradable polymers may be natural or synthetic polymers including, but not limited to, polyacrylics, polyamides, polyolefins (e.g., polyethylene, polypropylene, polyisobutylene, polystyrene, and the like), and any combination thereof. Examples of additional degradable polymers include, but are not limited to, polysaccharides (e.g., dextran, cellulose, and the like), chitins, chitosans, proteins, aliphatic polyesters, poly(lactides), poly(glycolides), poly(s-caprolactones), poly(hydroxybutyrates), poly(anhydrides), aliphatic or aromatic polycarbonates, poly(orthoesters), poly(amino acids), poly(ethylene oxides), polyphosphazenes, and any combinations thereof.

Dehydrated salt is suitable for use in the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof.

The degradable particulates may have the size and shape of the individual proppant particulates described herein, and are typically included in a greater amount when used in conjunction with individual proppant particulates as opposed to within a proppant aggregate. In some embodiments, it is preferred that the degradable particulates have a fiber shape. In some embodiments, the degradable particulates are present in a treatment fluid or within proppant aggregates in an amount in the range of about 1% to about 20% by weight of the proppant particulates in the treatment fluid or in the proppant aggregates, respectively, encompassing any value and subset therebetween. For example, the degradable particulates may be present in a treatment fluid or within a proppant aggregate in an amount of from about 1% to about 4%, or about 4% to about 8%, or about 8% to about 12%, or about 12% to about 16%, or about 16% to about 20% by weight of the proppant particulates in the treatment fluid or in the proppant aggregates, respectively, encompassing any value and subset therebetween. In some embodiments, the degradable particulates may be present to a lesser extent, in the range of about 1% to about 5% by weight of the proppant particulates forming proppant aggregates, encompassing any value and subset therebetween.

One or more of the treatment fluids described herein may comprise a gelling agent designed to increase the viscosity of the particular fluid, provided that the fluid continues to meet its particular viscosity requirements (e.g., whether a high-viscosity treatment fluid or a low-viscosity fluid). For example, the HVCSF specifically comprises a gelling agent (and optionally other additives), however, the additional treatment fluids of the present disclosure may also include a gelling agent provided that the viscosity requirements are met, without departing from the scope of the present disclosure.

Suitable gelling agents may include, but are not limited to, a natural polymer, a synthetic polymer, and any combination thereof. Oligomers, including those listed herein, capable of associating to form higher viscosity networks may also be used as the gelling agents, without departing from the scope of the present disclosure, provided that the particular treatment fluid into which they are included maintains the appropriate viscosity.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, pyranosyl sulfate, and any combination thereof. Specific examples of suitable polysaccharides may include, but are not limited to, a guar gum (e.g., hydroxyethyl guar, hydroxypropyl guar, carboxymethyl guar, carboxymethylhydroxyethyl guar, carboxymethylhydroxypropyl guar, and the like), a cellulose derivative (e.g., hydroxyethyl cellulose, carboxyethylcellulose, carboxymethylcellulose, carboxymethylhydroxyethylcellulose, and the like), xanthan, scleroglucan, succinoglycan, diutan, and any combination thereof.

Examples of suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamide and methacrylamidoalkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combination thereof.

In certain embodiments, the gelling agent may comprise an acrylamide/2-(methacryloyloxy)ethyltrimethylammonium methyl sulfate copolymer. In other certain embodiments, the gelling agent may comprise an acrylamide/2-(methacryloyloxy)ethyltrimethylammonium chloride copolymer. In yet other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount of from about 0.001% to about 0.5% by weight of the base fluid of the treatment fluid, encompassing any value and subset therebetween. For example, the gelling agent may be present in an amount of from about 0.001% to about 0.01%, or about 0.01% to about 0.1%, or about 0.1% to about 0.2%, or about 0.2% to about 0.3%, or about 0.3% to about 0.4%, or about 0.4% to about 0.5% each by weight of the base fluid of the treatment fluid, encompassing any value and subset therebetween. Each of these values is critical to the embodiments described herein and may depend on a number of factors including, but not limited to, the type of treatment fluid into which the gelling agent is included, the desired viscosity of the treatment fluid, the selected base fluid, the type of subterranean formation, and the like, and any combination thereof. Accordingly, more or less gelling agent may be selected to achieve the required viscosity for a particular treatment fluid, without departing from the scope of the present disclosure.

In some embodiments, it may be desirable to crosslink the gelling agent(s) in the treatment fluids to further increase the viscosity thereof, such as when the treatment fluid is a HVCSF or a HVFF, although it may be included in any other treatment fluid of the present disclosure provided that the viscosity requirements of the particular fluid is met. Inclusion of crosslinking agents can achieve increased viscosity due to crosslinking. When included in a treatment fluid, the crosslinking agents may include, but are not limited to, a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions.

In some embodiments, the crosslinking agent may be a multifunctional boronic acid crosslinking agent comprising a copolymer that comprises at least one boronic acid monomer unit and at least one water-soluble monomer unit. The multifunctional boronic acid crosslinking agent may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

The crosslinking agent is included in the treatment fluid in an amount to achieve the desired viscosity, provided that the viscosity remains within the parameters for a high-viscosity and/or a low-viscosity treatment fluid described herein.

At least the HVCSF of the present disclosure comprises a breaker that serves to "break" the viscosity of the HVCSF so that it can easily be produced out of the fracture(s) and formation to the surface. The breaker is capable of breaking the viscosity of a fluid by any mechanism, such as by breaking the bonds of a gelling agent and/or crosslinks of a crosslinking agent. Any of the other treatment fluids described herein may further include a breaker, provided that it does not interfere with the function of the fluid, where a gelling agent and/or crosslinking agent is included and is desirably broken at a point during performance of the particular subterranean formation operation (e.g., a hydraulic fracturing operation).

Examples of suitable breakers include, but are not limited to, an oxidative breaker, an acid breaker, a delayed release acid breaker, a delayed release enzyme breaker, a temperature activated breaker, a hydrolysable ester breaker, any encapsulated in an encapsulating material, and any combination thereof. Examples of oxidative breakers suitable include, but are not limited to, organic peroxides, alkali metal persulfates, and alkali metal chlorites, bromates, chlorates, hypochlorites, permanganates, and any combination thereof. Examples of acid breakers include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly(amino acids), and any combination thereof. Delayed release enzyme breakers may be used to catalyze the hydrolysis of glycosidic bonds between the monomer units of polysaccharides in the gel, thus reducing the gel viscosity.

Examples of suitable delayed release enzyme breakers include, but are not limited to, alpha and beta amylases, exo- and endo-glucosidases, amyloglucosidase, oligoglucosidase, invertase, maltase, cellulase, hemicellulase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Examples of such enzyme breakers include, but are not limited to, cellulase, hemicellulase, endo-glucosidase, exoglucosidase, exo-xylanase, and any combination thereof. The two most preferred enzyme breakers are exo- and endo-glucosidases. Temperature activated breakers activate by being heated by the subterranean zone in which they are placed, or by another external heat source. Examples of suitable temperature activated breakers include, but are not limited to, alkaline earth metal peroxides, such as calcium peroxide and magnesium peroxide, zinc peroxide and mixtures thereof. Examples of suitable hydrolysable esters include, but are not limited to, sorbitol, catechol, dimethyl glutarate and mixtures of dimethyl glutarate, dimethyl succinate, dimethyl adipate, and any combination thereof.

In some embodiments, the breaker may be encapsulated in an encapsulating material that dissipates in or under downhole conditions. The encapsulating agent may act to delay activating the breaker until a desired time or upon contact with a desired condition. The encapsulating agent, in some embodiments, may be frangible, such that it is removed upon abrasion or shear (e.g., upon closure stress). In other embodiments, the encapsulating agent is a material that dissipates in the presence of a fluid or is otherwise permeable to a fluid, either naturally present or introduced into a downhole environment. As such, the encapsulating agent may be removed while suspended in the treatment fluids described herein. Suitable encapsulating agents that dissipate in the presence of an aqueous base fluid may include, but are not limited to, a salt, barium sulfate, benzoic acid, polyvinyl alcohol, sodium carbonate, sodium bicarbonate, calcium oxide, a degradable polymer, poly(glycolide), poly(ε-caprolactone), poly(hydroxybutyrate), poly(anhydride), poly(orthoester), poly(amino acid), poly(ethylene oxide), poly(phosphazene), and any combination thereof.

The breaker may be present in a treatment fluid (e.g., the HVCSF) in an amount in the range of from about 0.01% to about 2% by weight of the base fluid of the treatment fluid, encompassing any value and subset therebetween. For example, the breaker may be present in a treatment fluid of the present disclosure in an amount of from about 0.01% to about 0.4%, or about 0.4% to about 0.8%, or about 0.8% to about 1.2%, or about 1.2% to about 1.6%, or about 1.6% to about 2%, encompassing any value and subset therebetween. Each of these values is critical to the embodiments of the present disclosure and depends on a number of factors including, but not limited to, the type of gelling agent selected, the amount of gelling agent used, the original viscosity of the treatment fluid, the presence and/or amount of crosslinking agent, and the like, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated (e.g., where the LVPropF and HVCSF are introduced simultaneously rather than alternatingly).

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
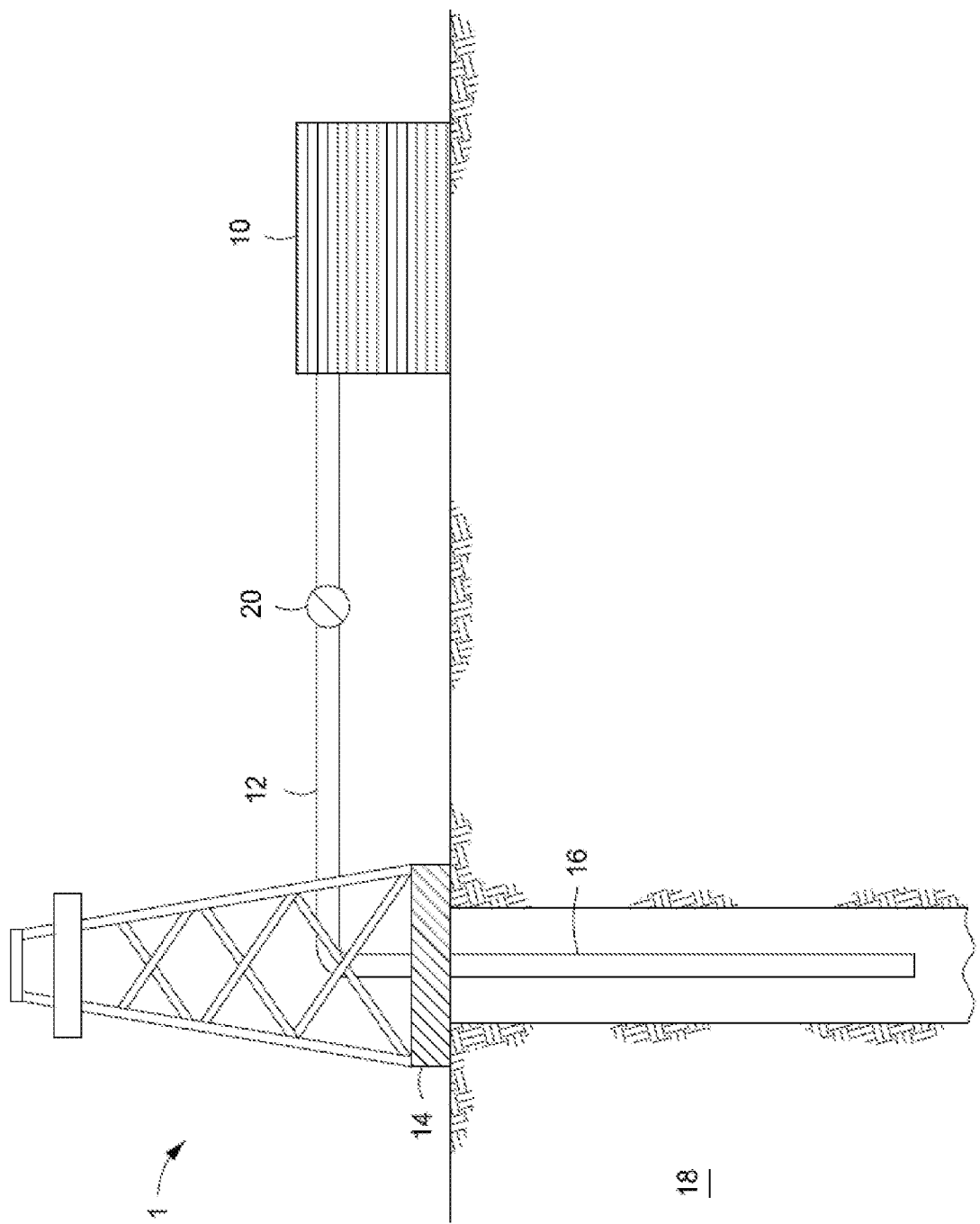
FIG. 2 depicts an embodiment of a system configured for delivering various treatment fluids of the embodiments described herein to a downhole location, according to one or more embodiments of the present disclosure.

FIG. 2 shows an illustrative schematic of a system that can deliver the treatment fluids (i.e., SFHVFF, the LVPadFs, the LVPropF, the DTF) of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A method comprising: (a) introducing a solids-free high-viscosity fracturing fluid (HVFF) into a subterranean formation at a first perforated interval above a fracture gradient pressure to create or enhance at least one dominate fracture in a first treatment interval therein; (b) introducing a low-viscosity pad fluid (LVPadF) into the subterranean formation at the first perforated interval above the fracture gradient pressure to create or enhance at least one first microfracture extending from the at least one dominate fracture, wherein the LVPadF comprises a first base fluid and micro-proppant, (c) placing at least a portion of the micro-proppant into the at least one first microfracture; (d) alternatingly introducing a first low-viscosity proppant fluid (LVPropF) and a high-viscosity crosslinked spacer fluid (HVCSF) into the subterranean formation at the first perforated interval, wherein the first LVPropF comprises a second base fluid and proppant aggregates, and wherein the HVCSF comprises a third base fluid, a gelling agent, a crosslinking agent, and a breaker; (e) placing at least a portion of the proppant aggregates into the dominate fracture, where the HVCSF separates clusters of proppant aggregates in the dominate fracture; (f) removing hydraulic pressure from the subterranean formation; and (g) activating the breaker in the HVCSF.

Embodiment B: A method comprising: (a) introducing a solids-free high-viscosity fracturing fluid (HVFF) into a subterranean formation at a first perforated interval above a fracture gradient pressure to create or enhance at least one dominate fracture in a first treatment interval therein; (b) introducing a low-viscosity pad fluid (LVPadF) into the subterranean formation at the first perforated interval above the fracture gradient pressure to create or enhance at least one first microfracture extending from the at least one dominate fracture, wherein the LVPadF comprises a first base fluid and micro-proppant, (c) placing at least a portion of the micro-proppant into the at least one first microfracture; (d) simultaneously introducing a first low-viscosity proppant fluid (LVPropF) and a high-viscosity crosslinked spacer fluid (HVCSF) into the subterranean formation at the first perforated interval, wherein the first LVPropF comprises a second base fluid and proppant aggregates, and wherein the HVCSF comprises a third base fluid, a gelling agent, a crosslinking agent, and a breaker; (e) placing at least a portion of the proppant aggregates into the dominate fracture, where the HVCSF separates clusters of proppant aggregates in the dominate fracture; (f) removing hydraulic pressure from the subterranean formation; and (g) activating the breaker in the HVCSF.

Each of Embodiments A and B may have one or more of the following additional elements in any combination:

Element 1: Further comprising performing (e1) after (e), (e1) comprising introducing a second LVPropF comprising a fourth base fluid and proppant particulates, and placing the proppant particulates in a near-wellbore region of the dominate fracture to form a proppant pack therein.

Element 2: Further comprising performing (e1) after (e), (e1) comprising introducing a second LVPropF comprising a fourth base fluid, proppant particulates, and degradable particulates, and placing the proppant particulates and the degradable particulates in a near-wellbore region of the dominate fracture to form a proppant pack therein.

Element 3: Wherein the proppant aggregates further comprise degradable particulates.

Element 4: Wherein the first LVPropF further comprises degradable particulates.

Element 5: Further comprising repeating one or more of (a) through (g) at the first perforated interval in the subterranean formation.

Element 6: Further comprising repeating (a) through (g) at at least a second perforated interval in the subterranean formation.

Element 7: Wherein the HVCSF further comprises micro-proppant.

Element 8: Wherein the proppant aggregates comprise proppant particulates and a binding agent, and the proppant particulates have a crush resistance of greater than about 10% fines when exposed to downhole closure stress and temperature in the subterranean formation.

Element 9: Further comprising a tubular extending from a wellhead and into the subterranean formation forming an annulus between the tubular and the subterranean formation, and a pump fluidly coupled to the tubular, the tubular or the annulus containing a fluid selected from the group consisting of the HVFF, the LVPadF, the first PVPropF, the HVCSF, and any combination thereof.

Element 10: Wherein the LVPropF and the HVCSF are introduced simultaneously into the subterranean formation at the first perforated interval, and wherein one of the LVPropF or the HVCSF is introduced into the subterranean formation through a tubular and the other is introduced into the subterranean formation through an annulus formed between the tubular and the subterranean formation, wherein the LVPropF and the HVCSF do not contact one another until reaching the first perforated interval.

By way of non-limiting example, exemplary combinations applicable to A and/or B include: 1-10; 2, 3, and 9; 3 and 10; 4, 5, and 8; 2, 5, 7, and 9; 1 and 10; 4, 5, and 8; 6 and 7; 7 and 9; 3, 5, and 7; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) introducing a solids-free high-viscosity fracturing fluid (HVFF) into a subterranean formation at a first perforated interval above a fracture gradient pressure to create or enhance a dominate fracture in a first treatment interval therein;
   (b) then introducing a low-viscosity pad fluid (LVPadF) into the subterranean formation at the first perforated interval above the fracture gradient pressure to create or enhance a first microfracture extending from the dominate fracture, whereby the dominate fracture continues to grow in length as the first microfracture is created or enhanced;
   wherein the LVPadF comprises a first base fluid and micro-proppant,
   (c) placing at least a portion of the micro-proppant into the first microfracture;
   (d) then alternatingly introducing a first low-viscosity proppant fluid (LVPropF) and a high-viscosity crosslinked spacer fluid (HVCSF) into the subterranean formation at the first perforated interval,
   wherein the first LVPropF comprises a second base fluid and proppant aggregates, and
   wherein the HVCSF comprises a third base fluid, a gelling agent, a crosslinking agent, and a breaker;
   (e) placing at least a portion of the proppant aggregates into the dominate fracture, where the HVCSF separates clusters of proppant aggregates in the dominate fracture;
   (f) then removing hydraulic pressure from the subterranean formation; and
   (g) activating the breaker in the HVCSF;
   wherein the high-viscosity fluids each have a viscosity of about 50 cP to about 20000 cP and the low-viscosity fluids each have a viscosity of about 1 cP to about 100 cP.

2. The method of claim 1, further comprising performing (e1) after (e), (e1) comprising introducing a second LVPropF comprising a fourth base fluid and proppant particulates, and placing the proppant particulates in a near-wellbore region of the dominate fracture to form a proppant pack therein.

3. The method of claim 1, further comprising performing (e1) after (e), (e1) comprising introducing a second LVPropF comprising a fourth base fluid, proppant particulates, and degradable particulates, and placing the proppant particulates and the degradable particulates in a near-wellbore region of the dominate fracture to form a proppant pack therein.

4. The method of claim 1, wherein the proppant aggregates further comprise degradable particulates.

5. The method of claim 1, wherein the first LVPropF further comprises degradable particulates.

6. The method of claim 1, further comprising repeating one or more of (a) through (g) at the first perforated interval in the subterranean formation.

7. The method of claim 1, further comprising repeating (a) through (g) at at least a second perforated interval in the subterranean formation.

8. The method of claim 1, wherein the HVCSF further comprises micro-proppant.

9. The method of claim 1, wherein the proppant aggregates comprise proppant particulates and a binding agent, and the proppant particulates have a crush resistance of greater than about 10% fines when exposed to downhole closure stress and temperature in the subterranean formation.

10. The method of claim 1, further comprising a tubular extending from a wellhead and into the subterranean formation forming an annulus between the tubular and the subterranean formation, and a pump fluidly coupled to the tubular, the tubular or the annulus containing a fluid selected from the group consisting of the HVFF, the LVPadF, the first LVPropF, the HVCSF, and any combination thereof.

11. A method comprising:
    (a) introducing a solids-free high-viscosity fracturing fluid (HVFF) into a subterranean formation at a first perforated interval above a fracture gradient pressure to create or enhance a dominate fracture in a first treatment interval therein;
    (b) then introducing a low-viscosity pad fluid (LVPadF) into the subterranean formation at the first perforated interval above the fracture gradient pressure to create or enhance a first microfracture extending from the dominate fracture, whereby the dominate fracture continues to grow in length as the first microfracture is created or enhanced;
    wherein the LVPadF comprises a first base fluid and micro-proppant,
    (c) placing at least a portion of the micro-proppant into the first microfracture;
    (d) then simultaneously introducing a first low-viscosity proppant fluid (LVPropF) and a high-viscosity crosslinked spacer fluid (HVCSF) into the subterranean formation at the first perforated interval,
    wherein the first LVPropF comprises a second base fluid and proppant aggregates, and
    wherein the HVCSF comprises a third base fluid, a gelling agent, a crosslinking agent, and a breaker;

(e) placing at least a portion of the proppant aggregates into the dominate fracture, where the HVCSF separates clusters of proppant aggregates in the dominate fracture;

(f) then removing hydraulic pressure from the subterranean formation; and (g) activating the breaker in the HVCSF;

wherein the high-viscosity fluids each have a viscosity of about 50 cP to about 20000 cP and the low-viscosity fluids each have a viscosity of about 1 cP to about 100 cP.

12. The method of claim 11, wherein one of the LVPropF or the HVCSF is introduced into the subterranean formation through a tubular and the other is introduced into the subterranean formation through an annulus formed between the tubular and the subterranean formation, wherein the first LVPropF and the HVCSF do not contact one another until reaching the first perforated interval.

13. The method of claim 11, further comprising performing (e1) after (e), (e1) comprising introducing a second LVPropF comprising a fourth base fluid and proppant particulates, and placing the proppant particulates in a near-wellbore region of the dominate fracture to form a proppant pack therein.

14. The method of claim 11, further comprising performing (e1) after (e), (e1) comprising introducing a second LVPropF comprising a fourth base fluid, proppant particulates, and degradable particulates, and placing the proppant particulates and the degradable particulates in a near-wellbore region of the dominate fracture to form a proppant pack therein.

15. The method of claim 11, wherein the first LVPropF further comprises degradable particulates.

16. The method of claim 11, further comprising repeating one or more of (a) through (g) at the first perforated interval in the subterranean formation.

17. The method of claim 11, further comprising repeating (a) through (g) at at least a second perforated interval in the subterranean formation.

18. The method of claim 11, wherein the HVCSF further comprises micro-proppant.

19. The method of claim 11, wherein the proppant aggregates comprise proppant particulates and a binding agent, and the proppant particulates have a crush resistance of greater than about 10% fines when exposed to downhole closure stress and temperature in the subterranean formation.

20. The method of claim 11, further comprising a tubular extending from a wellhead and into the subterranean formation forming an annulus between the tubular and the subterranean formation, and a pump fluidly coupled to the tubular, the tubular or the annulus containing a fluid selected from the group consisting of the HVFF, the LVPadF, the first LVPropF, the HVCSF, and any combination thereof.

* * * * *